(12) United States Patent
Kuge

(10) Patent No.: US 9,405,397 B2
(45) Date of Patent: Aug. 2, 2016

(54) TOUCH PANEL-EQUIPPED DISPLAY DEVICE AND NON-TRANSITORY COMPUTER-READABLE STORAGE MEDIUM

(71) Applicant: Sharp Kabushiki Kaisha, Osaka-shi, Osaka (JP)

(72) Inventor: Yoichi Kuge, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 11 days.

(21) Appl. No.: 14/429,865

(22) PCT Filed: Oct. 10, 2013

(86) PCT No.: PCT/JP2013/077596
§ 371 (c)(1),
(2) Date: Mar. 20, 2015

(87) PCT Pub. No.: WO2014/061547
PCT Pub. Date: Apr. 24, 2014

(65) Prior Publication Data
US 2015/0242042 A1   Aug. 27, 2015

(30) Foreign Application Priority Data

Oct. 15, 2012   (JP) ................................. 2012-227941

(51) Int. Cl.
*G06F 3/041* (2006.01)
*G06F 3/0488* (2013.01)
*G06T 11/20* (2006.01)
*G09G 5/18* (2006.01)

(52) U.S. Cl.
CPC ............ *G06F 3/0416* (2013.01); *G06F 3/0412* (2013.01); *G06F 3/04883* (2013.01); *G06T 11/20* (2013.01); *G09G 5/18* (2013.01)

(58) Field of Classification Search
CPC ..... G06F 3/041; G06F 3/0412; G06F 3/0416; G06F 3/0488; G06F 3/04883; G06T 11/20
USPC ...................... 345/173–179; 178/18.01–20.01
See application file for complete search history.

(56) References Cited

U.S. PATENT DOCUMENTS

| | | | | |
|---|---|---|---|---|
| 5,502,803 A | * | 3/1996 | Yoshida ................... | G06F 17/24 345/179 |
| 5,612,719 A | * | 3/1997 | Beernink ............. | G06F 3/04883 345/172 |
| 6,411,732 B1 | * | 6/2002 | Saund ................ | G06K 9/00409 382/187 |
| 2009/0201262 A1 | * | 8/2009 | Okamura .............. | G06F 3/0354 345/173 |
| 2010/0245266 A1 | * | 9/2010 | Tonouchi ............ | G06F 3/04883 345/173 |

(Continued)

FOREIGN PATENT DOCUMENTS

JP   2006-252141 A   9/2006

*Primary Examiner* — Hong Zhou
(74) *Attorney, Agent, or Firm* — Keating & Bennett, LLP

(57) ABSTRACT

A touch panel-equipped display device and program are provided that displays natural imagery that does not leave the user unsatisfied when a character, geometric shape or the like fed via the touch panel is displayed in a style that resembles one created with a brush (i.e. brush-written style). The touch panel-equipped display device includes a display panel unit, a touch panel unit, a touch panel controller, an application unit, a display processing unit and a panel driver. The application unit recognizes a touch point track on the touch panel surface based on touch point coordinate information, and performs the fade or hook drawing process depending on the touch point track.

4 Claims, 7 Drawing Sheets

(56) References Cited

U.S. PATENT DOCUMENTS

| | | | | |
|---|---|---|---|---|
| 2012/0176324 A1* | 7/2012 | Akiyama | ............ | G06F 3/0488 345/173 |
| 2013/0139084 A1* | 5/2013 | Han | ............ | G06F 3/04842 715/765 |
| 2014/0085209 A1* | 3/2014 | Runde | ............ | G06F 3/0488 345/173 |

* cited by examiner

FADE DRAWING PROCESS

HOOK DRAWING PROCESS

TOUCH PANEL-EQUIPPED DISPLAY DEVICE AND NON-TRANSITORY COMPUTER-READABLE STORAGE MEDIUM

TECHNICAL FIELD

The present invention relates to drawing processing techniques. More particularly, the present invention is directed to a touch panel-equipped display device and relates to techniques of converting information received via the touch panel and displaying (i.e. drawing) the converted information.

BACKGROUND ART

Touch panel-equipped display devices are available into which data such as characters or geometric shapes may be fed through handwriting. In such a touch panel-equipped display device, a user may draw a desired character or geometric shape on the touch panel with his finger or a stylus to feed data relating to this character or geometric shape into the touch panel-equipped display device, and then the data is displayed on the display surface of the touch panel-equipped display device. Some touch panel-equipped display devices are capable of displaying characters and geometric shapes fed via the touch panel in a style that resembles one created with a brush (i.e. brush-written style).

For example, Patent Document 1 discloses a technique for displaying imagery in a brush-written style by using varying drawing patterns based on the speed with which the depressed position on the touch panel moves.

CONVENTIONAL ART DOCUMENTS

Patent Documents

Patent Document 1: JP 2006-252141 A

SUMMARY OF THE INVENTION

Problems to be Solved by the Invention

Since the above conventional technique determines a drawing pattern based on the speed with which the depressed position on the touch panel moves, certain patterns that have been handwritten or certain levels of sensor sensitivity of the touch panel (position detection sensitivity) may result in displayed lines or the like on the display surface that are different from what the user imagined, leaving the user unsatisfied.

For example, when a "hook" ("hane" in Japanese) is drawn, the movement distance of the depressed point (i.e. touch point) between the position of the "stop" ("tome" in Japanese) and the position at which the finger or stylus is lifted off the touch panel (i.e. release point) is not very large. Further, since the speed with which the depressed point moves at the position of a "stop" is substantially zero, the depressed point will move at a release point, which is not very distant from the position of the "stop", with a speed that is not very large. As such, for some levels of sensor sensitivity of the touch panel, or for some drawn patterns determined by the speed with which the depressed point moves at a release point, the drawing of the "hook" (displayed on the display surface) does not have a sufficient length. In such cases, the drawing of the "hook" (displayed on the display surface) is shorter than that expected by the user, leaving the user unsatisfied.

In view of the above problems, an object of the present invention is to provide a touch panel-equipped display device and program that allow for displaying natural imagery that does not leave the user unsatisfied when a character or geometric shape inputted with the touch panel is displayed in a style that resembles one created with a brush (i.e. brush-written style).

Means to Solve the Problems

To solve the above problems, a touch panel-equipped display device of a first aspect includes a display panel unit, a touch panel unit, a touch panel controller, an application unit, a display processing unit, and a panel driver.

The display panel unit includes a display surface and is configured to display data on the display surface.

The touch panel unit includes a touch panel surface provided to cover the display surface.

The touch panel controller is configured to detect that the touch panel surface is being touched and sample, at a time interval, touch point coordinate information for identifying the position on the touch panel surface that is being touched.

The application unit is configured to recognize a touch point track on the touch panel surface based on the touch point coordinate information, and performing the following processes.

(1) When a time period during which the touch point stays in a stop determination region defined on the touch panel surface equals or exceeds a predetermined period of time and when a release point, which is the position at which the touch point is lifted off the touch panel surface, is within a stop clear region that includes the stop determination region and is not smaller than the stop determination region, the application unit determines that a hook drawing process is to be performed, calculates, as a first distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated first distance by a first coefficient to obtain a first adjusted distance, and creates drawing data used to draw a line from the release point to a position that is distant by the first adjusted distance.

(2) (A) When the touch point has been moved along the touch panel surface and a time period during which the touch point stays within the stop determination region equals or exceeds a predetermined period of time, or (B) when the touch point has been moved along the touch panel surface and the time period during which the touch point stays within the stop determination region equals or exceeds a predetermined period of time and the release point is not within the stop clear region, the application unit determines that a fade ("harai" in Japanese) drawing process is to be performed, calculates, as a second distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated second distance by a second coefficient that is smaller than the first coefficient to obtain a second adjusted distance, and creates drawing data used to draw a line from the release point to a position that is distant by the second adjusted distance.

The display processing unit is configured to generate display data and a display control signal for driving the display panel unit based on the drawing data generated by the application unit.

The panel driver is configured to drive the display panel unit based on the display data and the display control signal generated by the display processing unit.

Effects of the Invention

The present invention provides a touch panel-equipped display device and program that allow for displaying natural imagery that does not leave the user unsatisfied when a character or geometric shape inputted with the touch panel is displayed in a style that resembles one created with a brush (i.e. brush-written style).

EMBODIMENTS FOR CARRYING OUT THE INVENTION

First Embodiment

The first embodiment will be described below with reference to the drawings.

1.1: Construction of Touch Panel-Equipped Display Device

Figure 1:
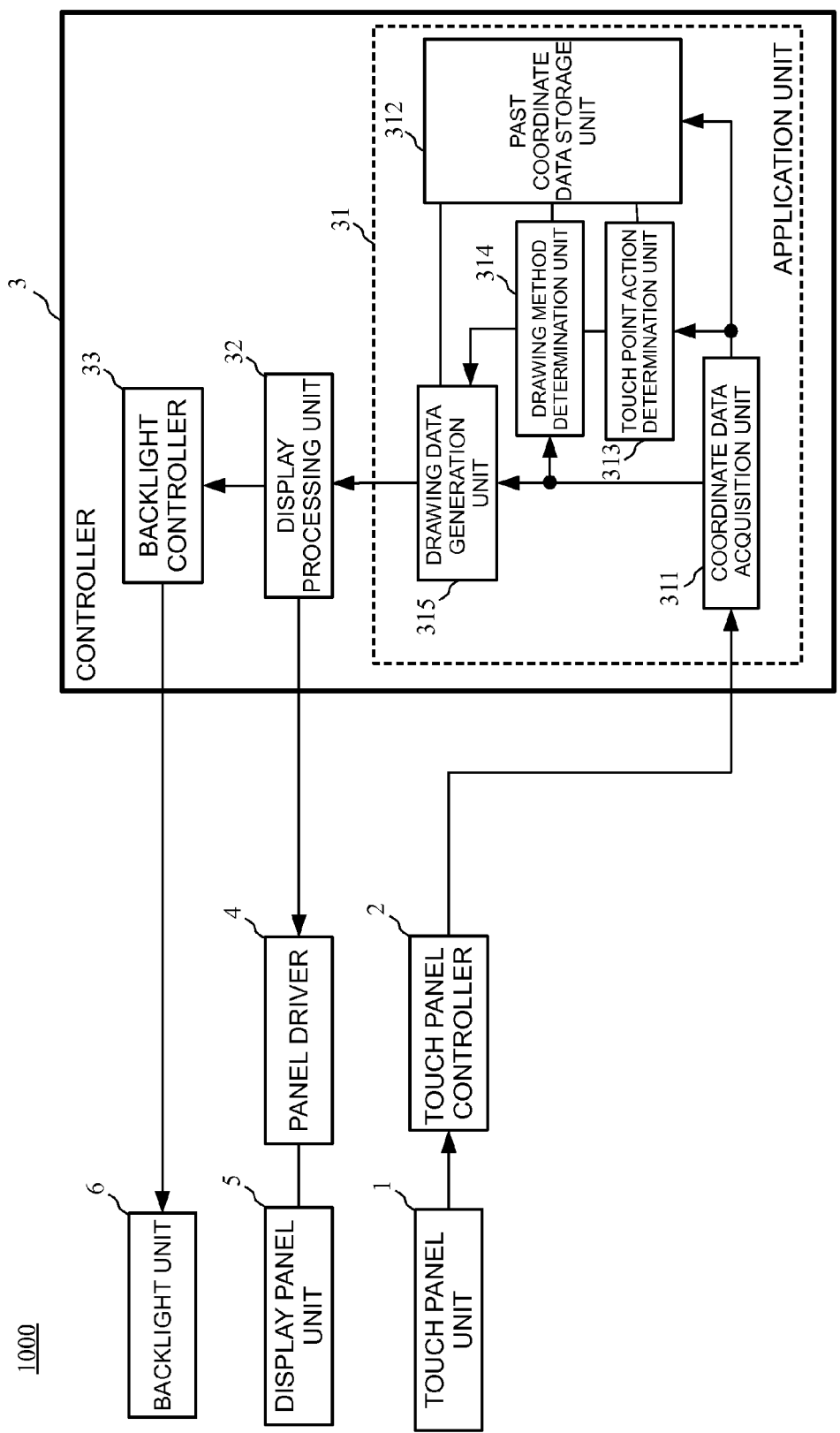
FIG. 1 is a schematic diagram of a touch panel-equipped display device 1000 of a first embodiment.

FIG. 1 is a schematic diagram of a touch panel-equipped display device 1000 of the first embodiment.

As shown in FIG. 1, the touch panel-equipped display device 1000 includes a touch panel unit 1, a touch panel controller 2, a controller 3, a panel driver 4, a display panel unit 5 and a backlight unit 6.

The touch panel unit 1 is positioned to cover the data display surface (not shown) of the display panel unit 5, where the touch panel surface may be touched by a finger, stylus (i.e., stylus pen) or the like to generate a change in the electric field or the like, and the amount of this change may be supplied to the touch panel controller 2 in the form of a predetermined physical quantity (for example, the amount of current or voltage generated depending on a change in the electric field).

The touch panel unit 1 may be implemented using a capacitive touch panel, for example.

The touch panel controller 2 receives the predetermined physical quantity (for example, the amount of current or voltage depending on the change in the electric field generated when the touch panel surface is touched) transmitted from the touch panel unit 1. Based on the physical quantity transmitted from the touch panel unit 1, the touch panel controller 2 obtains information (for example, coordinate information) relating to the touch position on the touch panel surface (i.e. the position that is being touched by the finger, stylus (i.e. stylus pen) or the like). The touch panel controller 2 transmits the obtained information relating to the touch position to the controller 3.

The controller 3 includes an application unit 31, a display processing unit 32 and a backlight controller 33, as shown in FIG. 1.

The application unit 31 includes a coordinate data acquisition unit 311, a past coordinate data storage unit 312, a touch point action determination unit 313, a drawing method determination unit 314 and a drawing data generation unit 315, as shown in FIG. 1.

The coordinate data acquisition unit 311 receives the information relating to the touch position transmitted from the touch panel controller 2. Based on the received information relating to the touch position, the coordinate data acquisition unit 311 acquires the coordinate information (i.e. coordinate data) of the touch position. Preferably, the coordinate data acquisition unit 311 may acquire the coordinate information (i.e. coordinate data) of the touch position on the touch panel surface after recognizing the correspondence between the coordinate system (two-dimensional coordinate system) on the touch panel surface of the touch panel unit 1 and the coordinate system (two-dimensional coordinate system) on the display surface of the display panel unit 5. The coordinate data acquisition unit 311 transmits the coordinate information (i.e. coordinate data) of the acquired touch position (or touch point) on the touch panel surface to the past coordinate data storage unit 312, the touch point action determination unit 313 and the drawing data generation unit 315.

The past coordinate data storage unit 312 receives the coordinate data transmitted from the coordinate data acquisition unit 311 and stores the coordinate data. The past coordinate data storage unit 312 is accessible by the touch point action determination unit 313, drawing method determination unit 314 and drawing data generation unit 315, and, in response to a request from the touch point action determination unit 313 and/or drawing method determination unit 314, transmits past coordinate data to the touch point action determination unit 313, drawing method determination unit 314 and/or drawing data generation unit 315.

The touch point action determination unit 313 receives the coordinate data of the touch point transmitted from the coordinate data acquisition unit 311. The touch point action determination unit 313 determines the action of the touch point based on coordinate data of the touch point. More specifically, the touch point action determination unit 313 determines whether the action of the touch point is (1) a move, (2) a stop, or (3) a release based on the current and/or past coordinate data of the touch point. The touch point action determination unit 313 then transmits the information relating to the determined touch point action (hereinafter referred to as "touch point action determination result") to the drawing method determination unit 314. Further, the touch point action determination unit 313 is capable of reading the coordinate data of a past touch point stored in the past coordinate data storage unit 312.

"Move" means that the touch point (i.e. the contact point between the touch panel and the finger, stylus or the like) moves continuously.

"Stop" means that the touch point (i.e. the contact point between the touch panel and the finger, stylus or the like) remains in a certain area (i.e. an area on the touch panel surface) for a certain period of time.

"Release" means that the touch point (i.e. the contact point between the touch panel and the finger, stylus or the like) transitions from a state of contact with the touch panel surface to a state of non-contact.

The drawing method determination unit 314 receives the information relating to the touch point action determination result transmitted from the touch point action determination unit 313 and determines what drawing method is to be employed based on the touch point action determination result. More specifically, based on the touch point action determination result, the drawing method determination unit 314 employs line drawing or one of (1) fade drawing, (2) hook drawing, and (3) dot drawing (described in detail further below) as the drawing method. The drawing method determination unit 314 then transmits information relating to the employed drawing method (hereinafter referred to as "drawing method determination result") to the drawing data generation unit 315. If the drawing method determination result is "fade drawing" or "hook drawing", information relating to additional drawing is also transmitted to the drawing data generation unit 315.

Further, the drawing method determination unit 314 is capable of reading the coordinate data of a past touch point stored in the past coordinate data storage unit 312.

The drawing data generation unit 315 receives the coordinate information (i.e. coordinate data) of the touch position transmitted from the coordinate data acquisition unit 311 and information relating to the drawing method determination result transmitted from the drawing method determination unit 314, and information relating to additional drawing (only when the drawing method determination result is "fade drawing" or "hook drawing"). The drawing method determination unit 314 generates drawing data based on the employed drawing method (described in detail further below). Also, the touch point action determination unit 313 is capable of reading the coordinate data of a past touch point stored in the past coordinate data storage unit 312. The drawing data generation unit 315 transmits the generated drawing data to the display processing unit 32.

The display processing unit 32 receives the drawing data transmitted from the drawing data generation unit 315 of the application unit 31. The display processing unit 32 generates display data and display control signals for causing the display panel unit 5 to perform drawing (displaying) based on the received drawing data. The display processing unit 32 then transmits the generated display data and display control signals to the panel driver 4. The display processing unit 32 also generates backlight control signals for controlling the backlight unit 6, and transmits them to the backlight controller 33.

The backlight controller 33 receives the backlight control signals transmitted from the display processing unit 32 and, in accordance with the transmitted backlight control signals, controls the backlight unit 6. The backlight controller 33 may control the backlight unit to save power depending on the display data. For example, when the screen is to be all black, the backlight controller 33 may control the backlight unit to reduce the intensity of light emitted by the light source (or switch off specified light sources).

The panel driver 4 receives the display data and display control signals transmitted from the display processing unit 32. The display control signals may include gate driving control signals and source driving control signals, for example. The panel driver 4 uses the gate driving control signals to control gate lines, and transmits signals corresponding to the display data to source lines at timings determined by the source driving control signals, thereby causing the display panel unit 5 to display the display data.

The display panel unit 5 is connected with the panel driver 4 via a multitude of source lines and a multitude of gate lines, where a pixel is positioned at the intersection of a source line and a gate line. Each pixel includes a switch element connected with the associated gate and source lines, and a display element (for example, a liquid crystal element). In each pixel, the display elements is controlled by a gate driving control signal transmitted through the associated gate line and a signal corresponding to the display data transmitted through the associated source line, allowing the display data to be displayed.

The backlight unit 6 includes at least one light source, and is controlled by a backlight control signal transmitted from the backlight controller 33 to adjust light emission. Light emitted by the light source of the backlight unit 6 illuminates the display panel unit 5 and passes through display elements (or is blocked by display elements) of the display panel unit 5 to allow the display data to be displayed on the display surface of the display panel unit 5. The light source of the backlight unit 6 may be composed of, for example, LEDs, a fluorescent lamp, an electric bulb, or an electroluminescent panel. The backlight unit 6 may be edge-lit or direct-lit. The backlight unit 6 may be constructed such that light emitted by the light source is reflected from a reflective plate and this reflected light illuminates the display panel unit 5.

1.2: Operation of Touch Panel-Equipped Display Device

The operation of a touch panel-equipped display device 1000 constructed as described above will be described below. The following is a description of the operation of the touch panel-equipped display device 1000 performed when the user feeds a character or the like through handwriting with a finger or stylus on the touch panel surface of the touch panel unit 1 of the touch panel-equipped display device 1000 and drawing in a brush-written style is performed on the display panel unit 5 of the touch panel-equipped display device 1000 (hereinafter referred to as "brush-written style drawing mode").

Figure 2:
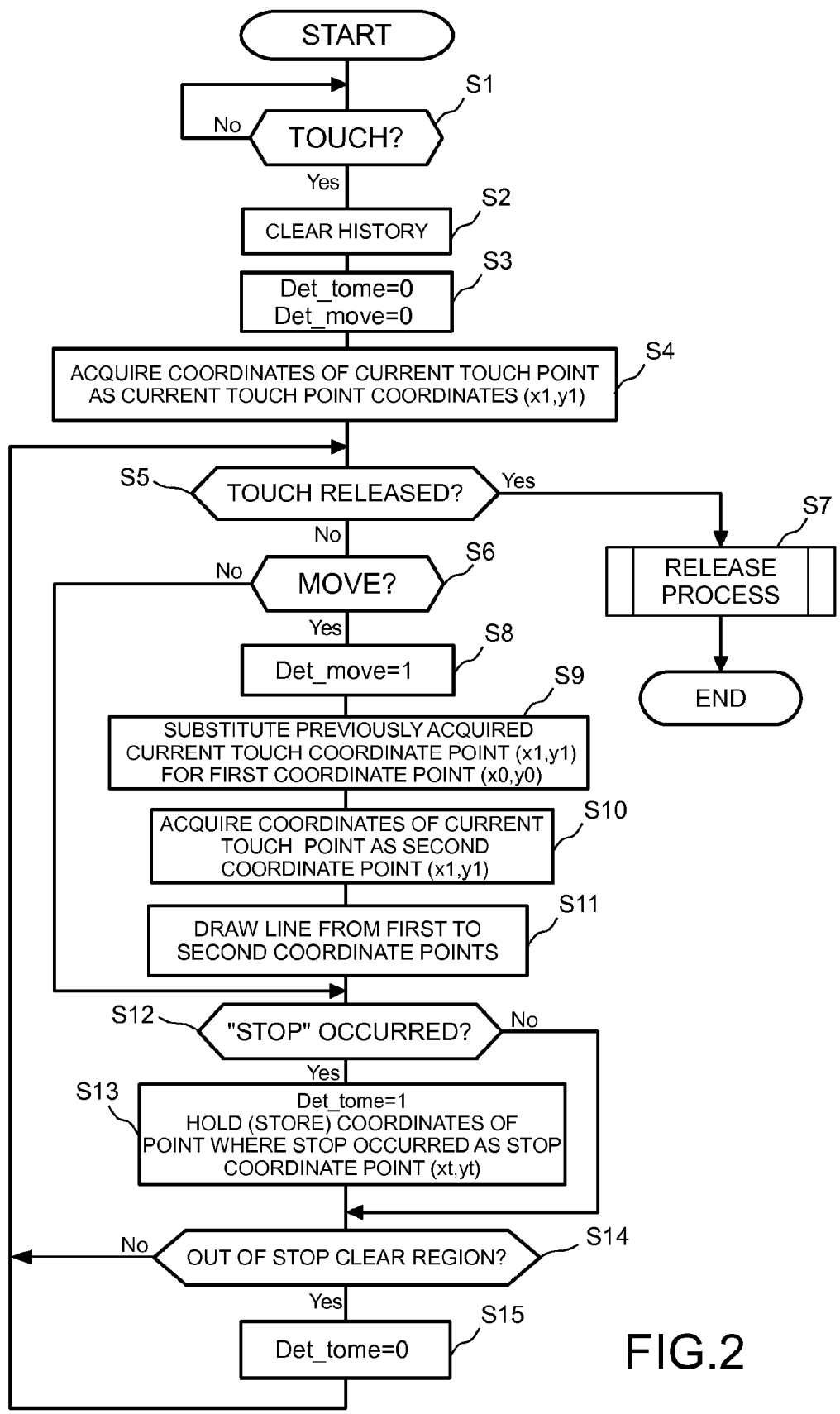
FIG. 2 is a flowchart showing processing by the touch panel-equipped display device 1000 in brush-written style drawing mode.
Figure 3:
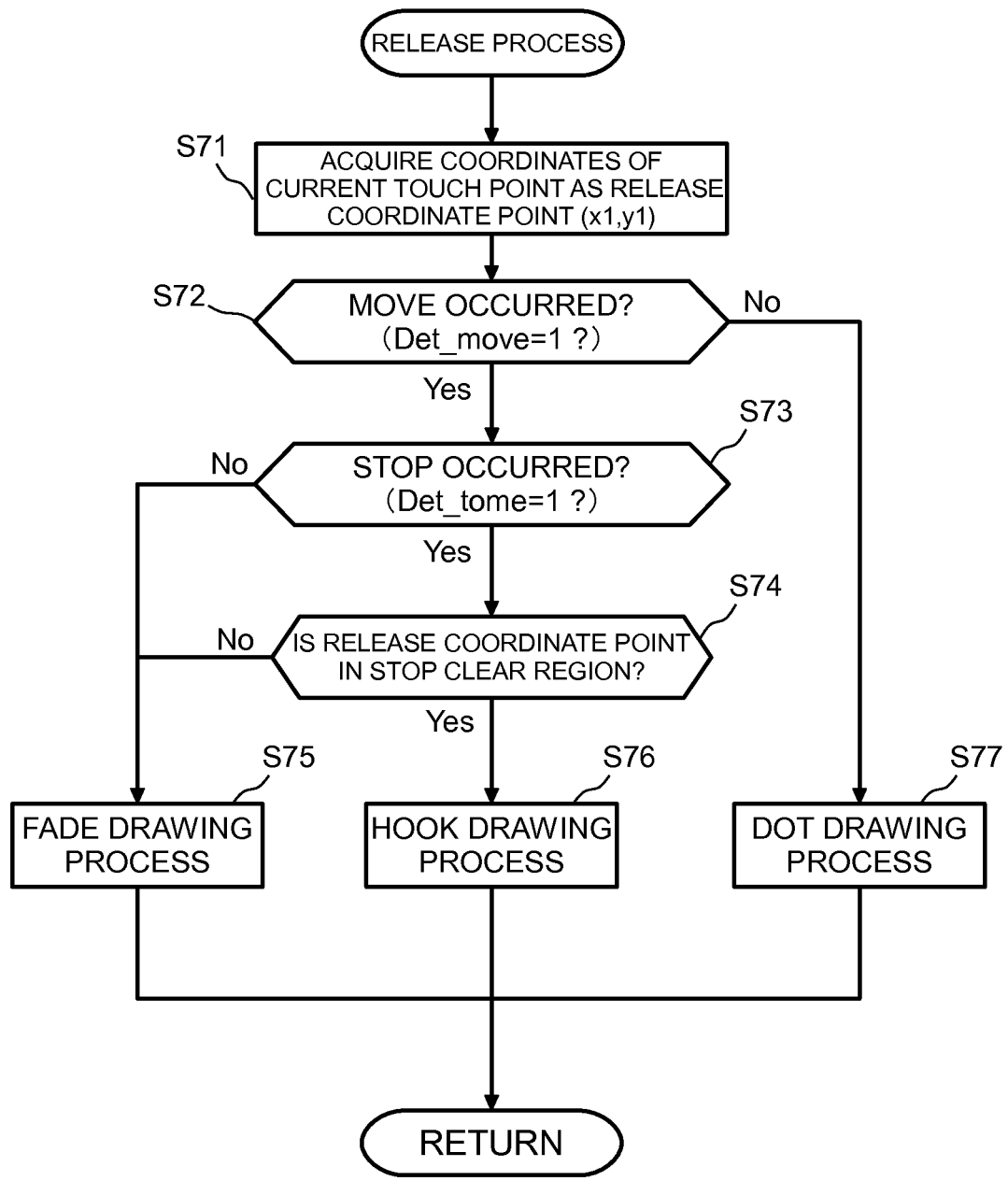
FIG. 3 is a flowchart showing processing by the touch panel-equipped display device 1000 in brush-written style drawing mode.

FIGS. 2 and 3 are flowcharts showing processing by the touch panel-equipped display device 1000 in brush-written style drawing mode. The operation of the touch panel-equipped display device 1000 in brush-written style drawing mode will be described below with reference to the flowcharts of FIGS. 2 and 3.

(S1 to S4):

The controller 3 monitors the touch panel of the touch panel unit 1 to detect a touch on the touch panel by a finger, stylus or the like. More specifically, the application unit 31 of the controller 3 monitors the output of the touch panel controller 2 to detect a touch (i.e. contact between the touch panel and the finger, stylus or the like) (step S1). When a touch is detected ("Yes" at step S1), the application unit 31 clears the history (i.e. clears the coordinate data or the like that was stored when the previous touch was detected and has been held since then) (step S2). Further, the application unit 31 sets a variable indicating whether a "stop" has been detected, Det_tome, to "0" (indicating that a "stop" has not been detected), and sets a variable indicating whether a "move" (i.e. a movement of the touch point) has been detected, Det_move, to "0" (indicating that a "move" has not been detected) (step S3). As used herein, "'move' (i.e. a movement of the touch point) has been detected" means that it is detected that the touch position (i.e. the position of contact between the finger, stylus or the like and the touch panel) on the touch panel surface has moved along the touch panel surface.

The coordinate data acquisition unit 311 of the application unit 31 acquires the current touch position (i.e. current touch point) in the form of the current touch point coordinates (x1,y1)(step S4). The application unit 31 (i.e. coordinate data acquisition unit 311) is aware of the correspondence between the two-dimensional coordinate axes defined on the touch panel surface and the two-dimensional coordinate axes defined on the display surface of the display panel unit 5. For ease of explanation, the following description presupposes that the two-dimensional coordinate axes defined on the touch panel surface are aligned with the two-dimensional coordinate axes defined on the display surface of the display panel unit 5. That is, in a top plan view of the touch panel surface and the display surface, the two sets of coordinate axes are aligned and coordinates (x,y) on the touch panel surface are identical with coordinates (x,y) on the display surface. In other words, the normal to the touch panel surface passing through the point of coordinates (x,y) of the touch panel surface crosses the display surface of the display panel 5 at the point of coordinates (x,y) of the display surface, which is identical with the point of coordinates (x,y) on the touch panel surface. It is supposed that the touch panel surface of the touch panel unit 1 and the display surface of the display panel unit 5 are positioned to be parallel to each other (i.e. their normal vectors are in the same direction).

(S5):

At step S5, the touch point action determination unit 313 of the application unit 31 determines whether the touch has been released (i.e. the finger, stylus or the like on the touch panel surface has been released), that is, whether there has been a "release". For example, it is determined whether there has been a "release" when the touch point action determination unit 313 detects the state where no coordinate information of a current touch point is transmitted from the touch panel controller 2 to the coordinate data acquisition unit 311 anymore and no coordinate information of a current touch point is transmitted from the coordinate data acquisition unit 311 to the touch point action determination unit 313 anymore. Alternatively, when there has been a "release", the coordinate data acquisition unit may supply the touch point action determination unit 313 with information indicating that there has been a "release" and, based on this information, the touch point action determination unit 313 may determine that there has been a "release".

If it is determined that there has been a "release", the touch point action determination unit 313 advances the process to step S7, and performs the release process, which is the process to be performed when a touch has been released. If it is determined that there has not been a "release", the touch point action determination unit 313 advances the process to step S6.

(S6-S10):

At step S6, the touch point action determination unit 313 determines whether there has been a move (i.e. a movement of the touch point). For example, the touch point action determination unit 313 compares the coordinates of the current touch point with the coordinates of the touch point acquired from the previous round of sampling and stored in the past coordinate data storage unit 312 to determine whether there has been a move (i.e. a movement of the touch point).

If it is determined at step S6 that there has not been a move (i.e. a movement of the touch point), the touch point action determination unit 313 advances the process to step S12.

If it is determined that there has been a move (i.e. a movement of the touch point), the touch point action determination unit 313 sets the variable indicating whether a move (i.e. a movement of the touch point) has been detected, Det_move, to "1" (indicating that there has been a move) (step S8).

At step S9, the drawing data generation unit 315 substitutes the coordinate data of coordinate point (x1,y1) acquired in the previous round of sampling for the coordinate data (x0,y0) of the first coordinate point, and holds the result.

At step S10, the drawing data generation unit 315 acquires the coordinate data of the coordinates of the current touch point acquired by the coordinate data acquisition unit 311 (i.e. the coordinate data acquired in the current round of sampling) in the form of the second coordinate point (x1,y1).

(S11):

At step S11, the drawing data generation unit 315 creates drawing data for causing a line to be drawn from the first coordinate point, (x0,y0), to the second coordinate point, (x1,y1). The drawing data generation unit 315 then supplies the display processing unit 32 with the generated drawing data (i.e. the drawing data for causing a line to be drawn from the first coordinate point, (x0,y0), to the second coordinate point, (x1,y1).

Based on the drawing data generated by the drawing data generation unit 315, the display processing unit 32 generates display data and display control signals for causing a line to be drawn from the first coordinate point, (x0,y0), to the second coordinate point, (x1,y1), on the display surface of the display panel unit 5. The display processing unit 32 then transmits the generated display data and display control signals to the panel driver 4.

The panel driver 4 controls the display panel unit 5 based on the display data and display control signals transmitted from the display processing unit 32. Thus, a line is drawn on the display surface of the display panel unit 5 from the first coordinate point, (x0,y0) (i.e. the point on the display surface corresponding to the first coordinate point), to the second coordinate point, (x1,y1) (i.e. the point on the display surface corresponding to the second coordinate point).

(S12, S13):

At step S12, the touch point action determination unit 313 determines whether there has been a "stop". The stop determination process will now be described with reference to FIG. 4.

Figure 4:
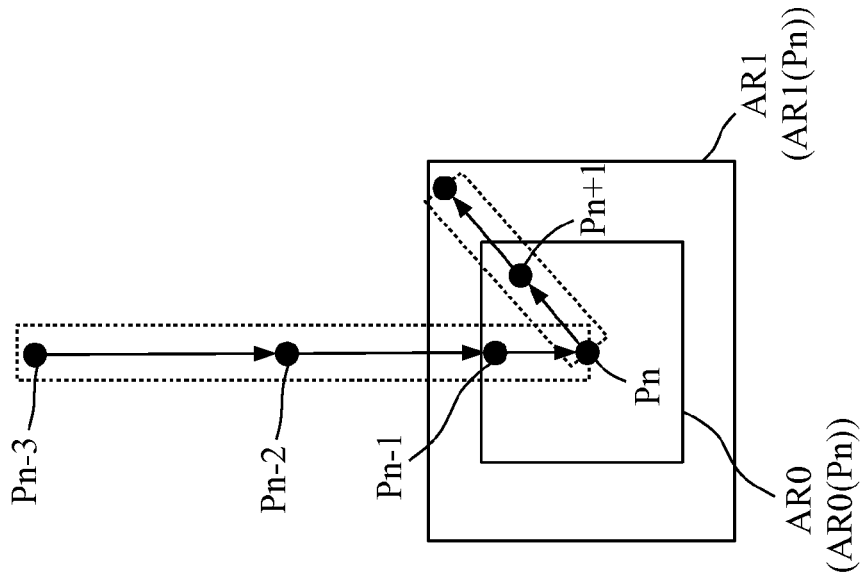
FIG. 4 illustrates a stop determination process.

FIG. 4 illustrates the stop determination process.

In FIG. 4, point Pn is the touch point at the current moment (i.e. current touch point); point Pn−1 is a touch point acquired in the previous round of sampling; and point Pn−k is a touch point acquired by the round of sampling that is k rounds earlier. Further, point Pn+1 is a touch point acquired in the next round of sampling after the touch point at the current moment (i.e. current touch point).

The touch point action determination unit 313 defines a stop determination region AR0 and a stop clear region AR1, and transmits the defined stop determination region AR0 and stop clear region AR1 to the past coordinate data storage unit 312. The past coordinate data storage unit 312 stores the stop determination region AR0 and stop clear region AR1.

The stop clear region AR1 defined by the touch point action determination unit 313 is larger than the stop determination region AR0. The sizes of the stop determination region AR0 and stop clear region AR1 are determined taking into consideration the size of the display surface of the display panel unit 5, the touch sensitivity of the touch panel of the touch panel unit 1, and other factors. The stop determination region AR0 and stop clear region AR1 may be rectangular, circular or elliptical in shape.

In the following description, the stop determination region AR0 defined with respect to point Pn will be referred to as AR0(Pn+1), and the stop clear region AR1 defined with respect to point Pn will be referred to as AR1(Pn+1).

The touch point action determination unit 313 determines that there is a stop point when staying of the touch point in the stop determination region for a period of time is detected. For example, the touch point action determination unit 313 defines a stop determination region AR0(Pn) and a stop clear region AR1(Pn) at a time when the current touch point is Pn. At a time when the current touch point is Pn+1, the touch point action determination unit 313 acquires the data of the coordinates of the past two points, Pn and Pn−1, stored in the past coordinate data storage unit 312, and determines whether the current touch point P2 and the past two touch points Pn and Pn−1, i.e. three touch points in total, are all within the stop determination region AR0(Pn). In the example of FIG. 4, the three points Pn+1, Pn and Pn−1 are all within the stop determination region AR0(Pn), and thus the touch point action determination unit 313 determines that there has (had) been a "stop". Further, the touch point action determination unit 313 determines that the stop point is point Pn.

In the above description, for ease of explanation, three touch points are used to perform the stop determination process; however, the present invention is not limited to such an implementation, and point numbers other than three and larger than one (i.e. a plurality of touch points) may be used to perform the stop determination process. FIG. 4 schematically illustrates a touch point track (as one example), and, needless to say, the present invention is not limited to such an example (the same applies to the other examples). As such, the distance between touch points to be sampled may be smaller than that in FIG. 4 (the same applies to the other implementations).

If there are a plurality of stop point candidates, it is preferable to define the point where the direction of the touch point track changes most significantly as the stop point. For example, if the angle formed by the straight line that connects point Pk−1 with point Pk and the straight line that connects point Pk with point Pk+1 (i.e. the acute one) is designated by θ, the touch point action determination unit 313 suitably defines the one of the stop point candidates that has the smallest angle θ, i.e. point Pk, as the stop point.

When a "stop" has been detected, the touch point action determination unit 313 advances the process to step S13, at which step the touch point action determination unit 313 sets the variable indicating whether it is determined that a stop has been detected, Det_tome, to "1" (indicating that a stop has been detected). Further, the touch point action determination unit 313 transmits the coordinate data of the stop point (in the example of FIG. 4, the coordinate data of point Pn) to the past coordinate data storage unit 312, and the past coordinate data storage unit 312 stores the coordinate data of the stop point. Further, the touch point action determination unit 313 sets the stop clear region AR1 to AR1(Pn) and supplies the past coordinate data storage unit 312 with information relating to the stop clear region AR1(Pn) (if the stop clear region is rectangular in shape, for example, the coordinate information of the center point of the stop clear region, and the information relating to the horizontal and vertical dimensions of the stop clear region). The past coordinate data storage unit 312 then stores information relating to this stop clear region AR1(Pn).

If a "stop" is not detected, the touch point action determination unit 313 advances the process to step S14.

(S14, S15):

At step S14, the touch point action determination unit 313 refers to the value of variable Det_tome stored in the past coordinate data storage unit 312 and, if variable Det_tome is "1" (indicating that a stop has been detected), acquires the information relating to the stop clear region AR1 stored in the past coordinate data storage unit 312. Then, based on the information relating to the stop clear region AR1 that has been acquired, the touch point action determination unit 313 determines whether the current touch point is outside this stop clear region AR1.

This will be further described with reference to FIG. 5.

Figure 5:
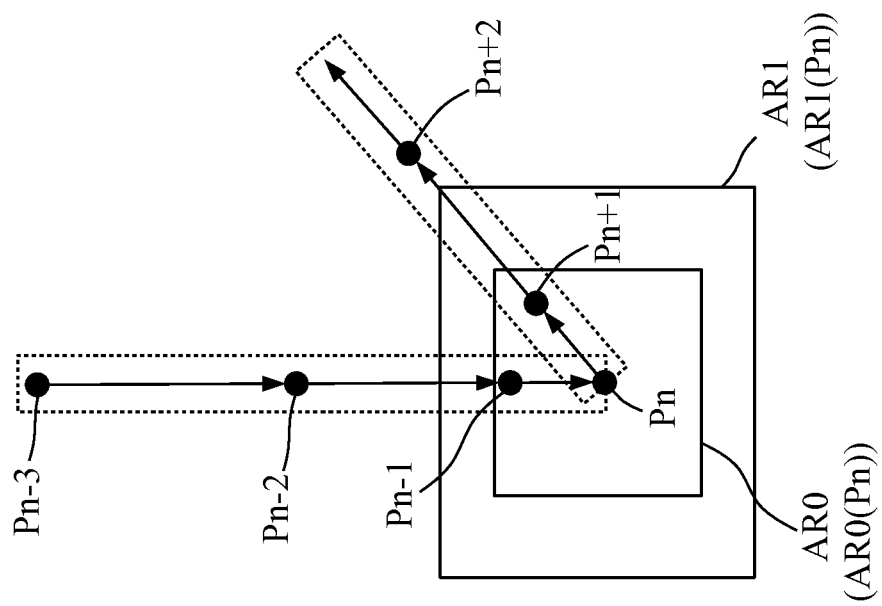
FIG. 5 illustrates a stop clear determination process.

FIG. 5 is similar to FIG. 4 and schematically illustrates a touch point track Pn−3 to Pn+2. The following description presupposes that the stop point is touch point Pn, the stop determination region is AR0(Pn), the stop clear region is AR1(Pn), and the stop determination region AR0(Pn) and stop clear region AR1(Pn) are defined as shown in FIG. 5.

When the current touch point is Pn+1, which is within the stop clear region AR1(Pn) of FIG. 5, the touch point action determination unit 313 determines that the touch point has not yet exited out of the stop clear region, and thus advances (or returns) the process to step S5.

When the current touch point is Pn+2, which is outside the stop clear region AR1(Pn) of FIG. 5, the touch point action determination unit 313 determines that the touch point has exited out of the stop clear region, and thus sets variable Det_tome indicating that a stop has been detected to "0" (i.e. clears it). The touch point action determination unit 313 then supplies the past coordinate data storage unit 312 with variable Det_tome which has been set to "0", and the past coordinate data storage unit 312 stores variable Det_tome (=0).

(S7 (Release Process):

At step S7, the release process (steps S71 to S77 of FIG. 3), which is the process performed when the finger, stylus or the like (i.e. the touch point) is released from the touch panel surface of the touch panel unit 1, is performed.

(S71, S72):

At step S71, the touch point action determination unit 313 acquires release coordinate point (x1,y1) as the current touch point (i.e. the last touch point before the finger, stylus or the like is released).

At step S72, the drawing method determination unit 314 refers to variable Det_move indicating whether there has been a move to determine whether there has been a move. If it is determined that there has not been a move, the drawing method determination unit 314 advances the process to step S77 (dot drawing process).

If there has been a move, the drawing method determination unit 314 advances the process to step S73.

(S73, S74):

At step S73, the drawing method determination unit 314 refers to variable Det_tome indicating whether a stop has been detected to determine whether a stop has been detected and the stop determination has not been cleared (i.e. the current touch point has not exited out of the stop clear region). If it is determined that a stop has been detected and the stop determination has not been cleared (i.e. the current touch point has not exited out of the stop clear region), the drawing method determination unit 314 advances the process to step S74. Otherwise, the drawing method determination unit 314 advances the process to step S75 (fade drawing process).

At step S74, the drawing method determination unit 314 determines whether the release coordinate point is within the stop clear region AR1. If it is determined that the release coordinate point is within the stop clear region AR1, the drawing method determination unit 314 advances the process to step S76 (hook drawing process).

(S75 (Fade Drawing Process)):

At step S74, the fade drawing process is performed. More specifically, the drawing data generation unit 315 creates drawing data used for performing the fade drawing process and, based on the created drawing data, the display processing unit 32 generates display data and display control signals. Then, in response to the display data and display control signals, the panel driver 4 drives the display panel unit 5 to perform the fade drawing process.

The fade drawing process will be described below with reference to FIG. 6.

Figure 6:
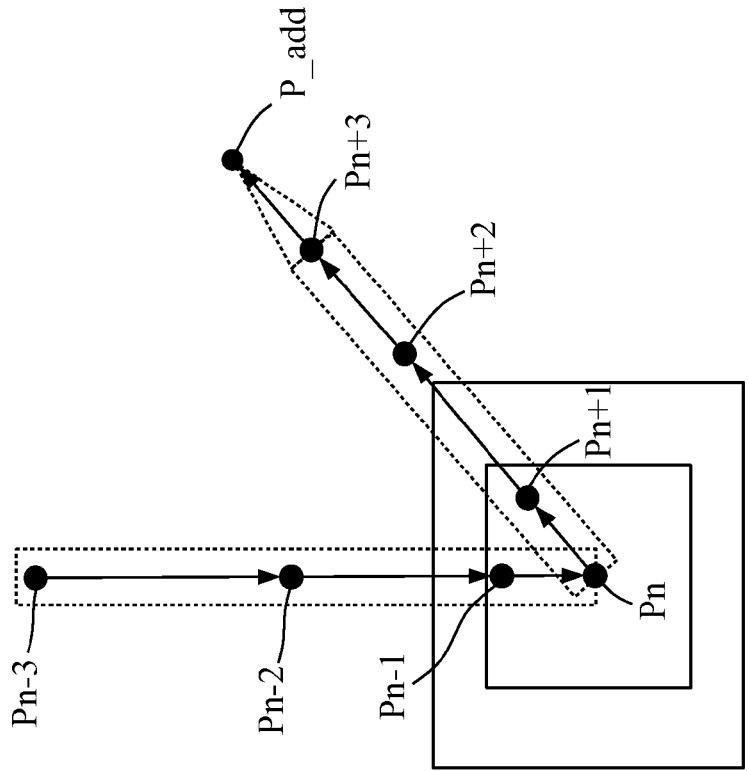
FIG. 6 illustrates a fade drawing process.

FIG. 6 is similar to FIGS. 4 and 5 and schematically illustrates a touch point track Pn−3 to Pn+3. In FIG. 6, point Pn+3 is the release point (i.e. the point at which the finger, stylus or the like is released from the touch panel surface).

In the example of FIG. 6, the drawing data generation unit 315 performs additional line drawing from the release point Pn+3 to point P_add. The drawing data generation unit 315 determines the point at the end of the additional drawing, P_add, based on vector Vec (Pn+2,Pn+3) (i.e. the vector beginning at point Pn+2 and ending at Pn+3). For example, the drawing data generation unit 315 positions point P_add such that $$L(Pn+3,Pn\_add)=L(Vec(Pn+2,Pn+3))\times g\_harai,$$

where L(Pn+3,Pn_add) is the distance between point Pn+3 and point P_add, L(Vec(Pn+2,Pn+3)) is the length of vector Vec(Pn+2,Pn+3) and g_harai is a coefficient, and the direction of vector Vec(Pn+3,P_add) is substantially the same as that of vector Vec(Pn+2,Pn+3).

The drawing data generation unit 315 then generates drawing data that causes a line to be drawn from point Pn+3 to point P_add, the line being tapered in width as it goes closer to point P_add.

The line drawing process is not limited to the above method and may be, for example, as follows: the drawing data generation unit 315 estimates the position of point P_add based on the track formed by the past k points (k is a natural number) including and before point Pn+3, thereby determining the position of point P_add. Then, the drawing data generation unit 315 generates drawing data that causes a line to be drawn from point Pn+3 to point P_add, the line being tapered in width as it goes closer to point P_add.

Further, in the example of FIG. 6, the drawing data generation unit 315 may use any number of touch points between stop point Pn and release point Pn+3 to estimate the position of point P_add at the end of the additional drawing. For example, it may position point P_add such that $$L(Pn+3,Pn\_add)=L(Vave)\times g\_harai,$$

where Vave is the average vector of Vec(Pn,Pn+1), Vec(Pn+1,Pn+2) and Vec(Pn+2,Pn+3), and the direction of vector Vec(Pn+3,P_add) is substantially the same as that of vector Vec(Pn+2,Pn+3).

(S76 (Hook Drawing Process)):

At step S76, the hook drawing process is performed. More specifically, the drawing data generation unit 315 creates drawing data for performing the hook drawing process and, based on the created drawing data, the display processing unit 32 creates display data and display control signals. Then, in response to the display data and display control signals, the panel driver 4 drives the display panel unit 5 to perform the hook drawing process.

The hook drawing process will be described below with reference to FIG. 7.

Figure 7:
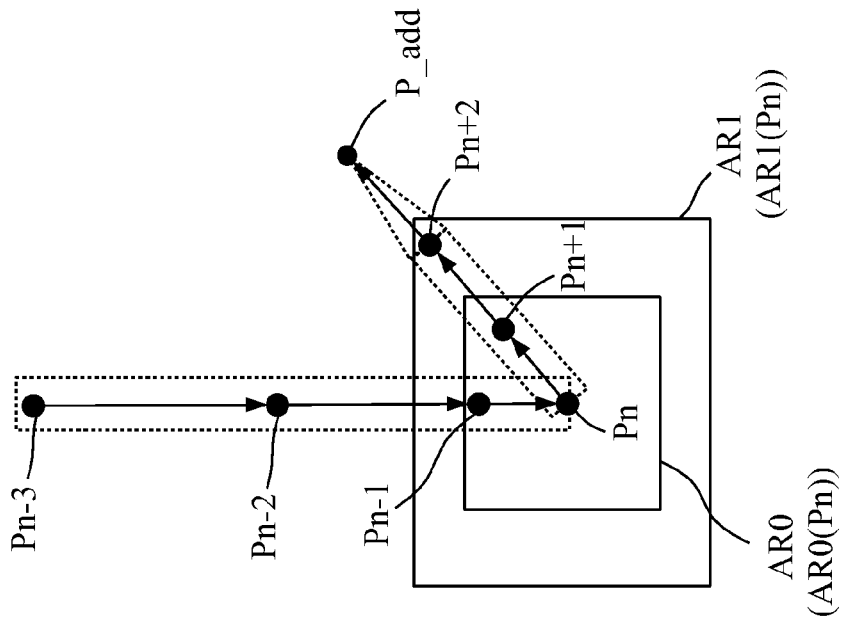
FIG. 7 illustrates a hook drawing process.

FIG. 7 is similar to FIGS. 4 and 5 and schematically illustrates a touch point track Pn−3 to Pn+2. In FIG. 7, point Pn+2 is the release point (i.e. the point at which the finger, stylus or the like is released from the touch panel surface).

In the example of FIG. 7, the drawing data generation unit 315 performs additional line drawing from release point Pn+2 to point P_add. The drawing data generation unit 315 determines the point at the end of the additional drawing, P_add, based on vector Vec(Pn+1,Pn+2) (i.e. the vector beginning at point Pn+1 and ending at Pn+2). For example, the drawing data generation unit 315 positions point P_add such that $$L(Pn+2,Pn\_add)=L(Vec(Pn+1,Pn+2))\times g\_hane,$$

where L(Pn+2,Pn_add) is the distance between point Pn+2 and point P_add, L(Vec(Pn+1,Pn+2)) is the length of vector Vec(Pn+1,Pn+2) and g_hane is a coefficient, and the direction of vector Vec(Pn+2,P_add) is substantially the same as that of vector Vec(Pn+1,Pn+2).

The drawing data generation unit 315 then generates drawing data that causes a line to be drawn from point Pn+2 to point P_add, the line being tapered in width as it goes closer to point P_add.

Preferably, g_hane, which is the value of the coefficient used in the hook drawing process, is larger than g_harai, which is the value of the coefficient used in the fade drawing process.

Further, the drawing data generation unit 315 may set g_hane, which is the value of the coefficient used in the hook drawing process, to a larger value as the distance between the stop point and release point decreases.

Further, the line drawing process is not limited to the above method and may be, for example, as follows: the drawing data generation unit 315 estimates the position of point P_add based on the track formed by the past k points (k is a natural number) including and before point Pn+2, thereby determining the position of point P_add. The drawing data generation unit 315 then generates drawing data that causes a line to be drawn from point Pn+2 to point P_add, the line being tapered in width as it goes closer to point P_add.

Further, in the example of FIG. 7, the drawing data generation unit 315 may use any number of touch points between stop point Pn and release point Pn+2 to estimate the position of point P_add at the end of the additional drawing. For example, it may position point P_add such that $$L(Pn+2,Pn\_add)=L(Vave)\times g\_hane,$$

where Vave is the average vector of Vec(Pn,Pn+1) and Vec(Pn+1,Pn+2), and the direction of vector Vec(Pn+2,P_add) is substantially the same as that of vector Vec(Pn+1,Pn+2).

In such a case, g_hane, which is the value of the coefficient used in the hook drawing process, is preferably larger than g_harai, which is the value of the coefficient used in the fade drawing process.

Further, the drawing data generation unit 315 may set g_hane, which is the value of the coefficient used in the hook drawing process, to a larger value as the distance between the stop point and release point decreases.

(S77 (Dot Drawing Process)):

At step S77, the dot drawing process is performed. In this case, the point first touched by the finger, stylus or the like is identical with the point where it released; accordingly, the drawing data generation unit 315 creates drawing data used in the dot drawing process (i.e. drawing data used for drawing a dot at the touch point (=release point)) and, based on the created drawing data, the display processing unit 32 generates display data and display control signals. Then, in response to the display data and display control signals, the panel driver 4 drives the display panel unit 5 to perform the dot drawing process.

Through the above processes, the touch panel-equipped display device 1000 performs drawing in a brush-written style.

In other words, when drawing is performed in a brush-written style, the touch panel-equipped display device 1000 performs the fade, hook or dot drawing process depending on the touch point track, thereby achieving a natural drawing that does not leave the user unsatisfied. In particular, the touch panel-equipped display device 1000 detects a stop point and, depending on the positional relationship between the stop point and release point, determines the length of an additional drawing that begins at the release point used in the hook drawing process. Thus, the touch panel-equipped display device 1000 achieves a natural hook drawing that does not leave the user unsatisfied.

Other Embodiments

The above embodiment presupposes that the touch panel unit 1 is a capacitive touch panel, for example; however, the present invention is not limited to such an arrangement. For example, the drawing processes described in the above embodiment may be applied to an optical sensor-equipped display panel (for example, an optical sensor-equipped liquid crystal display device).

In the above embodiment, the touch panel-equipped display device 1000 includes a backlight unit 6; however, the present invention is not limited to such an arrangement, and the drawing processes described in the above embodiment may be applied to a touch panel-equipped display device using, for example, a self-luminous display panel (for example, an organic EL panel or plasma display). In such implementations, the backlight unit 6 and the functional elements for controlling the backlight unit 6 may be omitted. Further, the processes for controlling the backlight unit 6 may also be omitted.

The above embodiment describes an implementation where a stop determination region AR0 and a stop clear region AR1 are defined for each current touch point, and information relating to the defined stop determination region AR0 and stop clear region AR1 is stored in the past coordinate data storage unit 312; however, the present invention is not limited to such an arrangement. For example, the distance between the current touch point and the previous touch point on the coordinate plane may be calculated from the positional relationship between them and, based on the calculated distance, it may be determined whether the current touch point is within the region that corresponds to the stop determination region AR0 and/or stop clear region AR1.

A portion or the entirety of the touch panel-equipped display device of the above embodiment may be implemented as an integrated circuit (for example, an LSI or system LSI).

A portion or the entirety of the processing of each functional block of the above embodiment may be implemented using a program. A portion or the entirety of the processing of each functional block of the above embodiment is performed by the central processing unit (CPU) in the computer. The program for performing such processing is stored in a storage device such as a hard disk or a ROM, and may be executed from the ROM or be read into a RAM and then executed.

The processing in the above embodiment may be implemented using hardware, or may be implemented using software (which includes cases where it is implemented together with an operating system (OS), middleware or a specified library). Alternatively, the processing may be implemented using mixed processing by software and hardware.

The steps of the processing method of the above embodiment are not necessarily performed in the order described in the above embodiment, and the method may be performed in a different order without departing from the spirit of the invention.

A computer program that causes a computer to perform the above method and a computer-readable recording medium that stores this program are included in the scope of the present invention. The computer-readable recording medium may be, for example, a flexible disc, hard disc, CD-ROM, MO, DVD, DVD-ROM, DVD-RAM, Blu-ray Disc (BD), or semiconductor memory.

The above computer program is not limited to those recorded on the above recording medium, and may be transmitted via a telecommunication line, wireless or wire communication line, or a network such as the Internet.

The present invention is not limited to the specific arrangement of the above embodiment, and various variations and modifications are possible without departing from the spirit of the invention.

Appendixes

The present invention may also be represented in the following manner.

A touch panel-equipped display device of a first aspect includes a display panel unit, a touch panel unit, a touch panel controller, an application unit, a display processing unit, and a panel driver.

The display panel unit includes a display surface and is configured to display data on the display surface.

The touch panel unit includes a touch panel surface provided to cover the display surface.

The touch panel controller is configured to detect that the touch panel surface is being touched and sample, at a time interval, touch point coordinate information for identifying the position on the touch panel surface that is being touched.

The application unit is configured to recognize a touch point track on the touch panel surface based on the touch point coordinate information, and performing the following processes.

(1) When a time period during which the touch point stays in a stop determination region defined on the touch panel surface equals or exceeds a predetermined period of time and when a release point, which is the position at which the touch point is lifted off the touch panel surface, is within a stop clear region that includes the stop determination region and is not smaller than the stop determination region, the application unit determines that a hook drawing process is to be performed, calculates, as a first distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated first distance by a first coefficient to obtain a first adjusted distance, and creates drawing data used to draw a line from the release point to a position that is distant by the first adjusted distance.

(2) (A) When the touch point has been moved along the touch panel surface and a time period during which the touch point stays within the stop determination region equals or exceeds a predetermined period of time, or (B) when the touch point has been moved along the touch panel surface and the time period during which the touch point stays within the stop determination region equals or exceeds a predetermined period of time and the release point is not within the stop clear region, the application unit determines that a fade drawing process is to be performed, calculates, as a second distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated second distance by a second coefficient that is smaller than the first coefficient to obtain a second adjusted distance, and creates drawing data used to draw a line from the release point to a position that is distant by the second adjusted distance.

The display processing unit is configured to generate display data and a display control signal for driving the display panel unit based on the drawing data generated by the application unit.

The panel driver is configured to drive the display panel unit based on the display data and the display control signal generated by the display processing unit.

As described above, the touch panel-equipped display device performs the hook or fade drawing process depending on the touch point track, thereby producing a natural drawing that does not leave the user unsatisfied. In particular, when detecting a stop, the touch panel-equipped display device produces a drawing with an additional drawing sufficiently long from the release point in the hook drawing process. This enables the touch panel-equipped display device to produce a natural hook drawing that does not leave the user unsatisfied.

A touch panel-equipped display device of a second aspect provides the touch panel-equipped display device of the first aspect in which when it is determined that the hook drawing process is to be performed, the application unit defines, as a stop point, the one of the touch points contained in the stop region at which the direction of the touch point track changes most significantly. Further, the application unit calculates the first distance using the touch point coordinate information of the touch point located between the stop point and the release point and sampled k rounds earlier (k is a natural number) before the release point is sampled, and the touch point coordinate information of the touch point located between the stop point and the release point and sampled n rounds earlier (n is a natural number, n<k) before the release point is sampled.

The touch panel-equipped display device detects a stop point and, dependent on the positional relationship between the stop point and the release point, determines the length of the additional drawing from the release point in the hook drawing process. This enables the touch panel-equipped display device to produce a drawing with a sufficiently long hook, thereby producing a natural hook drawing that does not leave the user unsatisfied.

A touch panel-equipped display device of a third aspect provides the touch panel-equipped display device of the second aspect in which when it is determined that the hook drawing process is to be performed, the application unit increases the value of the first coefficient as the distance between the stop point and the release point decreases.

The touch panel-equipped display device increases the value of the first coefficient as the distance between the stop point and the release point decreases such that the drawing has a sufficiently long hook even when the release point is close to the stop point, thereby producing a natural hook drawing that does not leave the user unsatisfied.

A non-transitory computer-readable storage medium having stored thereon a program of a fourth aspect is one having stored thereon a program for causing a computer to perform a drawing processing method usable in a touch panel-equipped display device including: a display panel unit, including a display surface, configured to display data on the display surface; a touch panel unit including a touch panel surface provided to cover the display surface; a touch panel controller configured to detect that on the touch panel surface is being touched and sample, at a time interval, touch point coordinate information for identifying the position on the touch panel surface that is being touched; and a panel driver configured to drive the display panel unit based on display data and a display control signal.

The drawing processing method includes an application step and a display processing step.

The application step recognizes a touch point track on the touch panel surface based on the touch point coordinate information, and performs the following steps.

(1) When a time period during which the touch point stays in a stop determination region defined on the touch panel surface equals or exceeds a predetermined period of time and when a release point, which is the position at which the touch point is lifted off the touch panel surface, is within a stop clear region that includes the stop determination region and is not smaller than the stop determination region, the application step determines that a hook drawing process is to be performed, calculates, as a first distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated first distance by a first coefficient to obtain a first adjusted distance, and creates drawing data used to draw a line from the release point to a position that is distant by the first adjusted distance.

(2) (A) When the touch point has been moved along the touch panel surface and a time period during which the touch point stays within the stop determination region equals or exceeds a predetermined period of time, or (B) when the touch point has been moved along the touch panel surface and the time period during which the touch point stays within the stop determination region equals or exceeds a predetermined period of time and the release point is not within the stop clear region, the application step determines that a fade drawing process is to be performed, calculates, as a second distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplies the calculated second distance by a second coefficient that is smaller than the first coefficient to obtain a second adjusted distance, and creates drawing data used to draw a line from the release point to a position that is distant by the second adjusted distance.

The display processing step generates display data and a display control signal for driving the display panel unit based on the drawing data generated by the application step.

This provides a program that causes the same effects as the touch panel-equipped display device of the first arrangement.

INDUSTRIAL APPLICABILITY

The touch panel-equipped display device and program according to the present invention produce natural imagery that does not leave the user unsatisfied when a character or geometric shape fed via the touch panel is displayed in a style that resembles one created with a brush (i.e. brush-written style), and thus are useful in the industrial field of data input/display devices and may be implemented in this field.

EXPLANATION OF REFERENCE CHARACTERS

1000 touch panel-equipped display device
1 touch panel unit
2 touch panel controller
3 controller
31 application unit
32 display processing unit
4 panel driver
5 display panel unit

The invention claimed is:
1. A touch panel-equipped display device comprising:
a display panel unit, including a display surface, configured to display data on the display surface;

a touch panel unit including a touch panel surface provided to cover the display surface;

a touch panel controller configured to detect that the touch panel surface is being touched and sample, at a time interval, touch point coordinate information for identifying the position on the touch panel surface that is being touched;

an application unit configured to recognize a touch point track on the touch panel surface based on the touch point coordinate information, and (1) when a time period during which the touch point stays in a stop determination region defined on the touch panel surface equals or exceeds a predetermined period of time and when a release point, which is the position at which the touch point is lifted off the touch panel surface, is within a stop clear region that includes the stop determination region and is not smaller than the stop determination region, determine that a hook drawing process is to be performed, calculate, as a first distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiply the calculated first distance by a first coefficient to obtain a first adjusted distance, and create drawing data used to draw a line from the release point to a position that is distant by the first adjusted distance, and, (2) (A) when the touch point has been moved along the touch panel surface and a time period during which the touch point stays within the stop determination region equals or exceeds a predetermined period of time, or (B) when the touch point has been moved along the touch panel surface and the time period during which the touch point stays within the stop determination region equals or exceeds a predetermined period of time and the release point is not within the stop clear region, determine that a fade drawing process is to be performed, calculate, as a second distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiply the calculated second distance by a second coefficient that is smaller than the first coefficient to obtain a second adjusted distance, and create drawing data used to draw a line from the release point to a position that is distant by the second adjusted distance;

a display processing unit configured to generate display data and a display control signal for driving the display panel unit based on the drawing data generated by the application unit; and a panel driver configured to drive the display panel unit based on the display data and the display control signal generated by the display processing unit.

2. The touch panel-equipped display device according to claim 1, wherein:

when it is determined that the hook drawing process is to be performed, the application unit defines, as a stop point, the one of the touch points contained in the stop region at which the direction of the touch point track changes most significantly, and the application unit calculates the first distance using the touch point coordinate information of the touch point located between the stop point and the release point and sampled k rounds earlier (k is a natural number) before the release point is sampled, and the touch point coordinate information of the touch point located between the stop point and the release point and sampled n rounds earlier (n is a natural number, n<k) before the release point is sampled.

3. The touch panel-equipped display device according to claim 2, wherein, when it is determined that the hook drawing process is to be performed, the application unit increases the value of the first coefficient as the distance between the stop point and the release point decreases.

4. A non-transitory computer-readable storage medium having stored thereon a program for causing a computer to perform a drawing processing method usable in a touch panel-equipped display device including:

a display panel unit, including a display surface, configured to display data on the display surface;

a touch panel unit including a touch panel surface provided to cover the display surface;

a touch panel controller configured to detect that the touch panel surface is being touched and sample, at a time interval, touch point coordinate information for identifying the position on the touch panel surface that is being touched; and a panel driver configured to drive the display panel unit based on display data and a display control signal, the drawing processing method comprising:

an application step of recognizing a touch point track on the touch panel surface based on the touch point coordinate information, and (1) when a time period during which the touch point stays in a stop determination region defined on the touch panel surface equals or exceeds a predetermined period of time and when a release point, which is the position at which the touch point is lifted off the touch panel surface, is within a stop clear region that includes the stop determination region and is not smaller than the stop determination region, determining that a hook drawing process is to be performed, calculating, as a first distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplying the calculated first distance by a first coefficient to obtain a first adjusted distance, and creating drawing data used to draw a line from the release point to a position that is distant by the first adjusted distance, and (2) (A) when the touch point has been moved along the touch panel surface and a time period during which the touch point stays within the stop determination region equals or exceeds a predetermined period of time, or (B) when the touch point has been moved along the touch panel surface and the time period during which the touch point stays within the stop determination region equals or exceeds a predetermined period of time and the release point is not within the stop clear region, determining that a fade drawing process is to be performed, calculating, as a second distance, the difference between the touch point coordinate information of the touch point sampled k rounds earlier (k is a natural number) before the release point is sampled and the touch point coordinate information of the touch point sampled n rounds earlier (n is a natural number, n<k) before the release point is sampled, multiplying the calculated second distance by a second coefficient that is smaller than the first coefficient to obtain a second adjusted distance, and creating drawing data used to draw a line from the release point to a position that is distant by the second adjusted distance; and a display processing step of generating display data and a display control signal for driving the display panel unit based on the drawing data generated by the application step.

* * * * *